United States Patent
Bauer et al.

(10) Patent No.: US 7,386,387 B2
(45) Date of Patent: Jun. 10, 2008

(54) METHOD FOR CONTROLLING AN INTERNAL COMBUSTION ENGINE USING VALVE LIFT SWITCHOVER

(75) Inventors: Erwin Bauer, Lappersdorf (DE); Dietmar Ellmer, Regensburg (DE); Bernhard Klingseis, Künzing (DE)

(73) Assignee: Siemens Aktiengesellschaft, Munich (DE)

( * ) Notice: Subject to any disclaimer, the term of this patent is extended or adjusted under 35 U.S.C. 154(b) by 94 days.

(21) Appl. No.: 11/546,498

(22) Filed: Oct. 11, 2006

(65) Prior Publication Data
US 2007/0088486 A1   Apr. 19, 2007

(30) Foreign Application Priority Data
Oct. 11, 2005   (DE) ............... 10 2005 048 703

(51) Int. Cl.
*G06F 17/00* (2006.01)
*F01L 1/34* (2006.01)

(52) U.S. Cl. ............... 701/103; 123/90.15; 180/65.2

(58) Field of Classification Search ........ 701/101–105, 701/110, 114; 180/65.2, 65.6; 123/90.15–90.18; 73/117.2, 118.1
See application file for complete search history.

(56) References Cited

U.S. PATENT DOCUMENTS

| | | | | |
|---|---|---|---|---|
| 5,000,280 A | * | 3/1991 | Wazaki et al. | 180/197 |
| 5,033,290 A | * | 7/1991 | Seki et al. | 73/118.1 |
| 5,239,963 A | * | 8/1993 | Ikebe et al. | 477/102 |
| 5,887,570 A | * | 3/1999 | Suzuki et al. | 123/406.44 |

FOREIGN PATENT DOCUMENTS

DE   10 2004 011 236 A1   9/2005

OTHER PUBLICATIONS

Richard Van Basshuysen and Fred Schäfer, Handbuch Verbrennungsmotor, Grundlagen, Komponenten, Systeme, Perspektiven, Auflage, Braunschweig [u.a.]; Published by Vierweg Verlag, 1st Edition, Apr. 2002.

* cited by examiner

*Primary Examiner*—Willis R. Wolfe, Jr.
*Assistant Examiner*—Johnny H. Hoang

(57) ABSTRACT

In one aspect, a method for controlling an internal combustion engine using valve lift switchover is provided. Within the scope of this method, a switchover intake manifold model for the switchover-relevant pressure range for valve lift switchover is applied in addition to the use of a basic intake manifold model. This ensures a valve lift switchover with approximately constant torque of the internal combustion engine.

16 Claims, 2 Drawing Sheets

US 7,386,387 B2

METHOD FOR CONTROLLING AN INTERNAL COMBUSTION ENGINE USING VALVE LIFT SWITCHOVER

CROSS REFERENCE TO RELATED APPLICATIONS

This application claims priority of German application No. 102005048703.3 DE filed Oct. 11, 2005, which is incorporated by reference herein in its entirety.

FIELD OF INVENTION

The present invention relates to a method for controlling an internal combustion engine using valve lift switchover, in particular using discrete valve lift switchover.

BACKGROUND OF INVENTION

The principle of valve lift switchover in internal combustion engines is known in the prior art. Thus, for example, systems such as Porsche's Vario Cam Plus have already been in series production for some years (see also "Handbuch Verbrennungsmotor" ("*Combustion engine manual*"), editor: van Basshuysen/Schäfer, published by Vierweg Verlag, 1st edition, April 2002). A continuing problem with this technology continues to be the valve lift switchover process as such. Switching from a small to a large valve lift in particular creates difficulties in respect of the torque neutrality of the internal combustion engine. Absence of torque neutrality of the internal combustion engine expresses itself in a noticeable bucking of the motor vehicle during the switchover from one valve lift to the other. The reason for the lack of torque neutrality lies in scarcely avoidable inaccuracies in the absorption coefficient or volumetric efficiency model (intake manifold model) of the internal combustion engine.

Said models, which run in the engine management system and are supplied therein with the corresponding operating data of the internal combustion engine, calculate the air mass supplied to the combustion process as a function of the operating point. From this, the fuel quantity that is to be injected is calculated with adherence to a specific air/fuel ratio and taking into account the predefined lambda value. Said fuel quantity in turn determines the expected torque of the respective combustion cycle of the internal combustion engine.

A separate model is stored in the engine management system for each valve lift configuration. The model data is stored in characteristic maps which are formed from what are referred to as sampling points. The quality criterion for the switchover is that the actual engine torque in both configurations—i.e. directly before and after the valve lift switchover—is the same as far as possible. However, even small errors in the model calculation lead to differences in torque and consequently to inaccuracies in the valve lift switchover.

A further problem at this juncture is that the combustion-related behavior of the internal combustion engine usually changes as a result of the valve lift switchover. This is mainly to be expected with channel injectors due to the changed flow cross-section at the valve. A further problem arises if, in the course of the valve lift switchover, a change in combustion behavior takes place, for example when a spark-ignition combustion process transitions to a controlled self-ignition.

In principle the models running in the engine management system can be executed with any desired degree of precision. However, the problem here is that the complexity of the models increases rapidly if all the parameters influencing a quantity to be mapped are to be recorded with a particular precision. Even modern engine management systems quickly reach their limits at this point. In this case the memory storage capacity and computing capacity of the engine management system are rapidly exhausted, with the result that ultimately compromises and sacrifices have to be made with regard to precision.

SUMMARY OF INVENTION

It is therefore an object of the present invention to provide a method for controlling an internal combustion engine using valve lift switchover which is characterized by an improved torque neutrality during valve lift switchover processes in comparison with the prior art.

The above object is achieved by a method as claimed in the independent claim. Preferred embodiments and developments of the present invention will emerge from the following description, the accompanying drawings and the dependent claims.

The method according to the invention for controlling an internal combustion engine using valve lift switchover comprises the following steps: determine a basic cylinder charge, in particular a basic air quantity, with the aid of a basic intake manifold model for at least one first and one second valve lift of the internal combustion engine starting from a recorded intake manifold pressure, detect a switchover-relevant pressure range for the valve lift switchover on the basis of the recorded intake manifold pressure, and determine a switchover cylinder charge corresponding to an operating point of the internal combustion engine for the switchover-relevant pressure range with the aid of a switchover intake manifold model, so that the valve lift switchover activated on the basis of the switchover cylinder charge can be executed with approximately constant torque of the engine.

The present method is preferably performed by means of an engine management system of the internal combustion engine. The starting point of the method is formed by the internal combustion engine's operating data that is continuously recorded by the engine management system, such as, for example, the intake manifold pressure, the engine speed, the throttle valve position and the like. One of the main elements of the present method is that outside of the switchover-relevant pressure range for the valve lift switchover the basic intake manifold model determines the basic cylinder charge corresponding to the operating point of the internal combustion engine. The basic intake manifold model is performed according to one embodiment simultaneously in each case for every possible valve lift of the internal combustion engine. When a valve lift switchover is requested by the engine management system, this enables the necessary operating data of the internal combustion engine to be made available, already calculated by the basic intake manifold model, for the new valve lift.

As soon as the engine management system detects that the internal combustion engine is situated in a switchover-relevant pressure range for valve lift switchover, the cylinder charge is calculated with the aid of the switchover intake manifold model. Compared to the basic intake manifold model this yields a higher-precision calculation of the cylinder charge, with the result that, taking into account a plurality of operating data of the internal combustion engine, a valve lift switchover with approximately constant torque of the internal combustion engine is possible, while at the same time the storage and computing overhead for the overall method for controlling the valve lift switchover is limited.

According to one embodiment the switchover intake manifold model for the switchover-relevant pressure range is composed of the basic intake manifold model for each valve lift and a charge correction model for each valve lift. The charge correction model for each valve lift yields more detailed cylinder charge data compared with the basic intake manifold model, so it is overlaid in a corrective manner on the values of the basic intake manifold model. In order to be able to determine the cylinder charge with a small amount of overhead, the basic intake manifold model operates with one basic characteristic map for each valve lift of the internal combustion engine. The charge correction model is likewise preferably based on characteristic maps stored in the engine management system, but can also, exactly like the basic intake manifold model, be performed by corresponding calculations not based on characteristic maps.

In the switchover intake manifold model, the basic intake manifold model and the charge correction model interact in such a way that in the charge correction model a correction value, in particular a correction air quantity, is determined for the basic cylinder charge for each valve lift, which correction value, when added to the basic cylinder charge, results in a correction cylinder charge. Whereas, according to one embodiment, the basic cylinder charge is also passed on in parallel with the determined correction cylinder charge for the purpose of determining the operating data, a correction of the operating data of the internal combustion engine is now also calculated on the basis of the correction cylinder charge. The specific correction variables determined in this connection are, for example, an injection time correction, an ignition angle correction and a correction of a throttle valve position. In this way a charge correction characteristic map which operates with higher precision compared to the basic intake manifold model in the switchover-relevant pressure range is preferably included in the determination of the operating data of the internal combustion engine.

According to a further embodiment a weighted determination of the correction cylinder charge is carried out in that, as the distance from a switchover pressure increases, a decreasing proportion of the correction value is incorporated in the correction cylinder charge.

According to a further embodiment of the present invention the switchover intake manifold model is formed solely by a detailed intake manifold model for each valve lift limited to the switchover-relevant pressure range.

In this embodiment, outside of the switchover-relevant pressure range only the basic intake manifold model is used for calculating the cylinder charge. In order to ensure a higher precision for the purpose of determining the operating data of the internal combustion engine inside the switchover-relevant pressure range, the switchover-relevant pressure range is used by the detailed intake manifold model for determining the cylinder charge data. Since, compared with the basic intake manifold model, the detailed intake manifold model is mapped onto a narrower intake manifold pressure range, more capacity for storing higher-precision operating data of the internal combustion engine is available in this case.

According to a further embodiment the detailed intake manifold model calculates the switchover cylinder charge for the respective valve lift specifically or said charge is determined based on a charge characteristic map specific to each valve lift.

According to a further embodiment the detailed intake manifold model is executed with greater precision than the basic intake manifold model in respect of the determination of the cylinder charge in order to save computing power and/or memory storage capacity overall.

BRIEF DESCRIPTION OF THE DRAWINGS

The present invention is explained in more detail with reference to the accompanying drawing, in which.

DETAILED DESCRIPTION OF INVENTION

Figure 1:
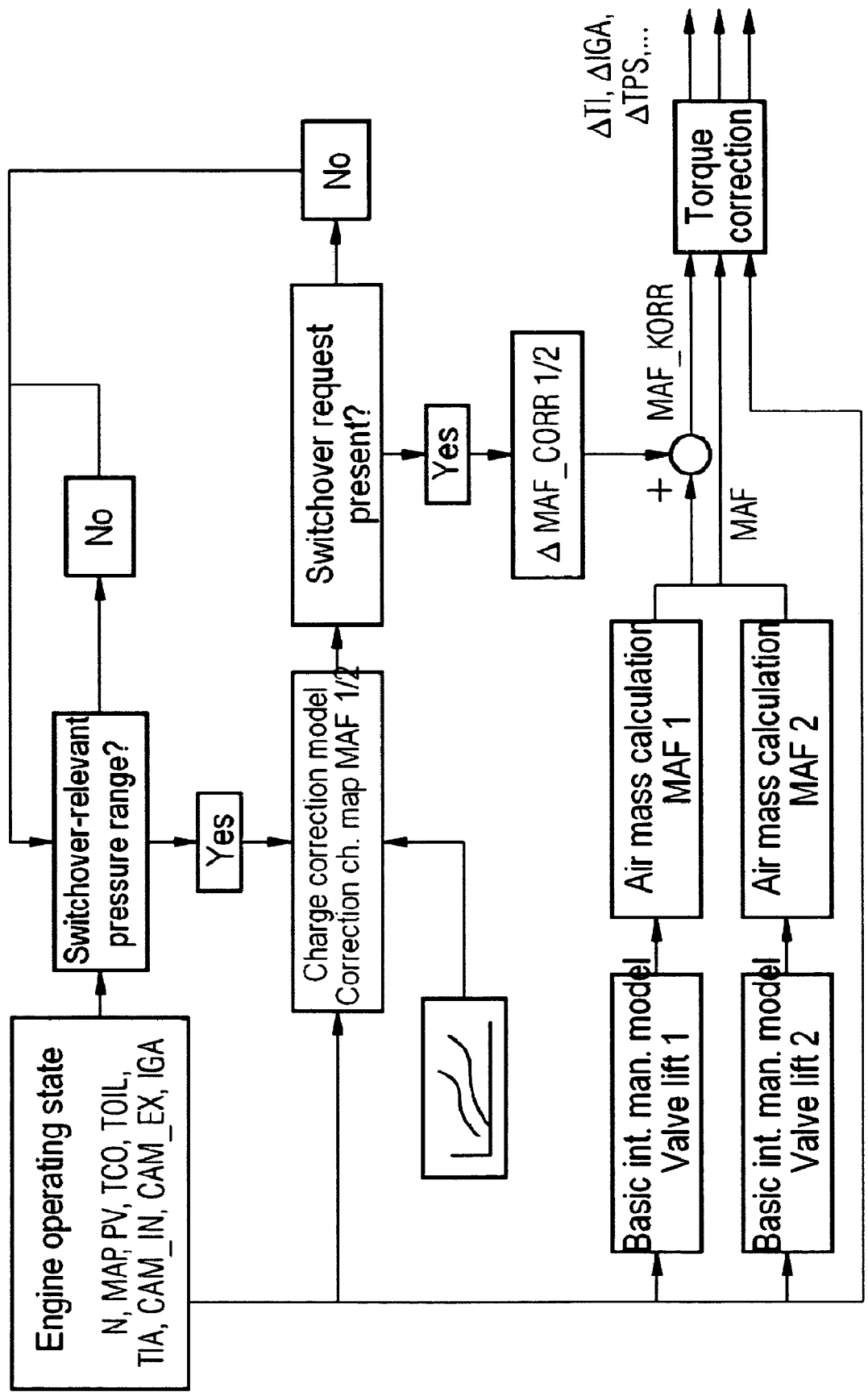
FIG. 1 shows a flow diagram of the valve lift switchover from valve lift 1 to valve lift 2 according to a first embodiment and FIG. 2 shows a flow diagram of the valve lift switchover from valve lift 1 to valve lift 2 according to a second embodiment.

One embodiment of the present invention is shown in FIG. 1. This depicts a flow diagram of the method for valve lift switchover which is executed within the engine management system of the internal combustion engine. The basis for this method is formed by the internal combustion engine's operating data which is recorded and forwarded to the engine management system. Said data includes, among other variables, the engine speed N, the accelerator pedal value PV, the intake manifold pressure MAP, the coolant temperature TCO, the oil temperature TOIL, the intake air temperature TIA, camshaft signals CAM_IN, CAM_EX and the cylinder-specific overall ignition angle IGA.

The recorded intake manifold pressure MAP preferably forms the starting point for controlling the switchover of the valve lift as a function of the operating state of the internal combustion engine. By way of example the valve lift is switched over between the discrete valve lift 1 and the discrete valve lift 2. It is also conceivable that a switchover can be made between more than two valve lifts, or that a continuously variable valve lift adjustment takes place.

The intake manifold pressure MAP represents a measure for the air quantity supplied as a function of the operating state of the internal combustion engine. In proportion to the air quantity which forms a component of the cylinder charge, fuel is metered in order to achieve the torque required according to the operating state of the internal combustion engine.

The engine operating state or, as the case may be, the above-cited operating data of the internal combustion engine is forwarded to the basic intake manifold model. The basic intake manifold model determines the basic cylinder charge in each case in parallel for each selectable valve lift of the internal combustion engine and as a function of the requested operating state or torque. The basic cylinder charge is preferably composed of a request for the basic air quantity MAF1, MAF2, to which the fuel quantity for operation of the internal combustion engine is then metered in proportion.

A switchover-relevant pressure range in which a switchover from one valve lift to another is performed is defined as a function of the absolute value of the intake manifold pressure MAP and the operating state of the internal combustion engine. If, according to the measured intake manifold pressure MAP, the internal combustion engine is situated outside of the switchover-relevant pressure range, the cylinder charge of the internal combustion engine is specified by the basic intake manifold model in the form of the basic cylinder charge. The basic cylinder charge, i.e. preferably the basic air quantity, can be calculated for example for each valve lift according to a calculation rule in the engine management system. It is equally conceivable to determine the basic air quantity for the purpose of saving computing power and memory storage capacity based on a basic characteristic map.

Compared with the switchover-relevant pressure range, the basic pressure range, i.e. the range in which the basic intake manifold model is used for calculating the cylinder charge, is relatively wide. In order to limit the computing overhead, only a limited amount of operating data is stored in the basic characteristic map and can therefore be processed in the basic intake manifold model. This restriction is applied in order not to increase the computing overhead and complexity of characteristic maps of this kind to uneconomic levels. Based on said basic characteristic map which is present for each valve lift of the internal combustion engine, the cylinder charge values, in particular the basic air quantity MAF1, MAF2 for valve lift 1 and valve lift 2, that are used for further control of the engine are specified in normal operation.

If the engine management system detects on the basis of the performance query, the intake manifold pressure MAP and/or a torque query that the internal combustion engine is situated in the switchover-relevant pressure range, the engine management system activates a switchover intake manifold model for the purpose of determining the switchover cylinder charge. The operating state of the internal combustion engine, the currently selected valve lift and the valve lift to be selected are included in the determination of the switchover cylinder charge. With the aid of this switchover intake manifold model a more precise determination of the cylinder charge, i.e. the switchover cylinder charge during the switchover from a first to a second valve lift, is carried out compared with the basic cylinder charge, with the result that the valve lift switchover of the internal combustion engine is performed with approximately constant torque, which is to say torque neutrality.

According to one embodiment, the switchover intake manifold model is composed of the basic intake manifold model for each valve lift and a charge correction model for each valve lift. After the detection of a switchover-relevant pressure range, the charge correction model determines correction values $\Delta MAF\_CORR$ 1 and $\Delta MAF\_CORR$ 2 for the cylinder charge on the basis of calculations or by means of a charge correction characteristic map for the possible valve lifts of the internal combustion engine. If the internal combustion engine is not in a switchover-relevant pressure range, the charge correction model is accordingly not activated. If, after the determination of the aforementioned correction values, a switchover request for the valve lift is made by the engine management system, the correction values $\Delta MAF\_CORR$ 1, 2 are overlaid on the air quantity values MAF1, MAF2 from the basic intake manifold model. Said overlaying is performed in an adder in which the correction air quantities $\Delta MAF\_CORR$ 1, $\Delta MAF\_CORR$ 2, which may have a positive or negative sign, are added to the basic air quantity MAF1, MAF2. Following this, both the basic air quantity MAF corresponding to the currently applied valve lift and the corrected basic air quantity MAF_CORR are forwarded to a torque correction block of the internal combustion engine.

The aforementioned correction characteristic map records of the charge correction model, which are represented for example by the diagram symbol in the charge correction model shown in FIG. 1, are implemented for storage capacity reasons in such a way that only a narrow intake manifold pressure range is mapped. This pressure range corresponds to the switchover-relevant pressure range, so the correction of the charge correction characteristic map acts precisely in this pressure range. The pressure range is chosen in this case such that the pressure value at which the valve lift switchover typically takes place is covered roughly centrally. Furthermore, the charge correction characteristic maps are provided with precise data and advantageously cover all influencing variables relevant to the cylinder charge, such as engine speed, intake air temperature, camshaft setting, swirl flap [sic] position, etc. This is achieved in that the corresponding characteristic map points are explicitly targeted and supplied with data in the vehicle or, as the case may be, engine application.

In the further method the correction cylinder charge MAF_CORR, preferably the corrected air quantity, compared with the basic cylinder charge Basic MAF, preferably the basic air quantity, is used to determine a corresponding torque correction for the internal combustion engine with the aid of a difference. It follows therefrom that the correction cylinder charge derived from the charge correction characteristic maps is applied to the operating data of the internal combustion engine calculated on the basis of the basic intake manifold model. In the "torque correction" block of the internal combustion engine already mentioned above, specific correction variables are therefore calculated for the operating data of the internal combustion engine, such as, for example, a correction of the injection time $\Delta TI$, a correction of the ignition angle, $\Delta IGA$, a correction of the throttle valve position $\Delta TPS$ and the like. Further calculation of the correction values therefore requires a certain computing overhead, because this must be taken into account in order to keep the torque of the internal combustion engine constant in all operating variables.

According to a further embodiment of the method, as the switchover-relevant pressure range is approached, the charge correction is taken into account in a weighted manner. In other words, the closer the intake manifold switchover pressure for the valve lift is approached, the greater the correction calculated by the charge correction model comes into effect. This allows a particularly soft transition between the valve lifts. Moreover, it is advantageous if the finely tuned basic intake manifold model range is implemented to be greater for the same data quantity than the switchover-relevant pressure range, since it is then ensured in any case that the more precise cylinder charge values are used for the switchover process.

Figure 2:
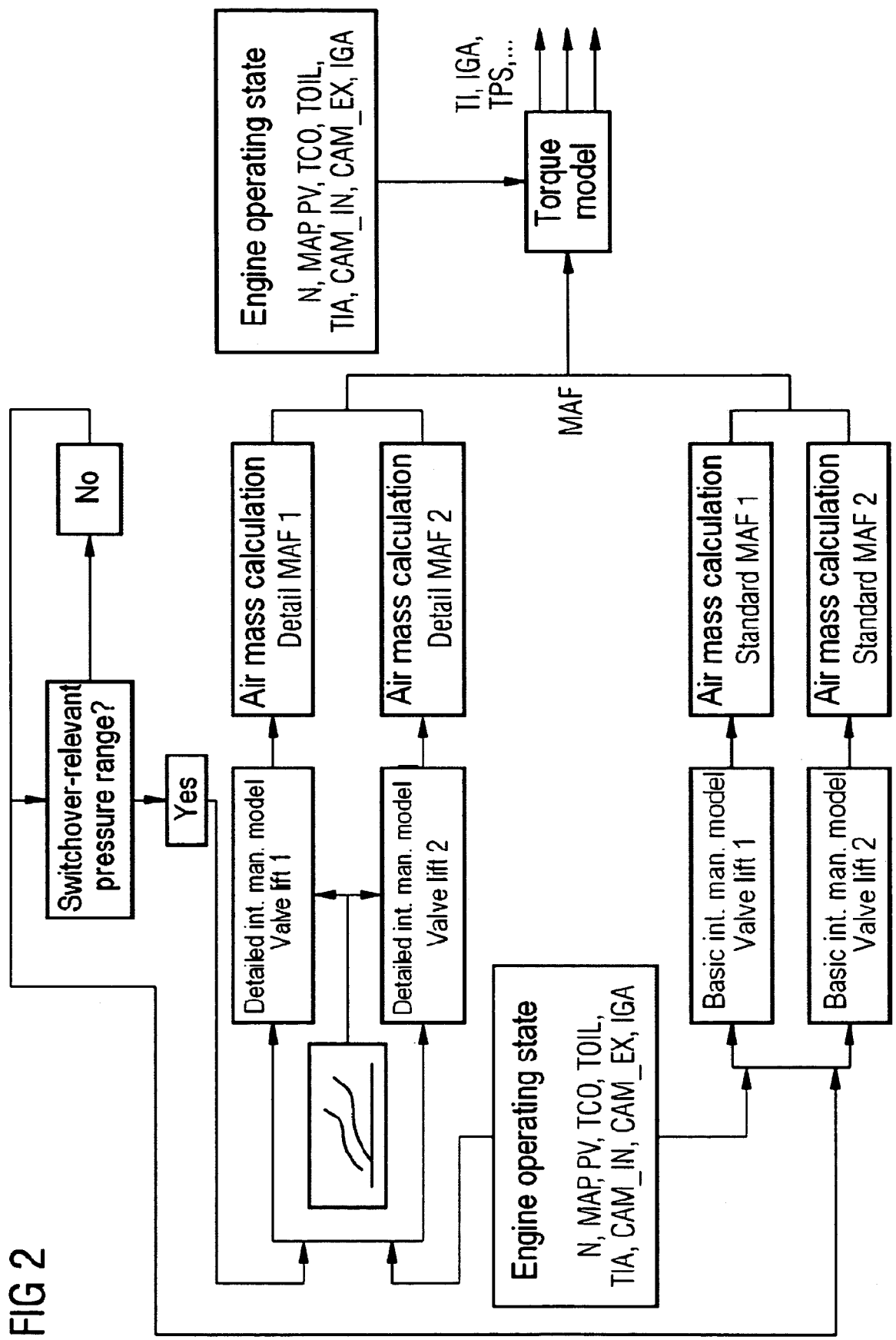

According to a further embodiment shown in FIG. 2, the engine management system comprises the basic intake manifold model already discussed above and a detailed intake manifold model for the valve lifts of the internal combustion engine that are possible in each case. Provided no switchover-relevant pressure range is detected by the engine management system, the cylinder charge and therefore the basic air quantity is specified by the basic intake manifold model in the same way as described above. If the engine management system detects a switchover-relevant pressure range on the basis of the operating state of the internal combustion engine, according to the method illustrated in FIG. 2, the detailed intake manifold model is activated, while the data of the basic intake manifold model is no longer forwarded to the torque model. The air quantity that is now to be specified for controlling the internal combustion engine is defined solely by the detailed intake manifold model.

Whereas the already cited operating status data of the internal combustion engine is incorporated both into the detailed intake manifold model and into the basic intake manifold model, no correction of the basic intake manifold model is performed in the switchover-relevant pressure range. Instead, an independent determination of the cylinder charge, preferably of the air quantity DETAIL MAF1 and DETAIL MAF2, is carried out in this range. Said determination can be performed either by calculation or based on characteristic maps. The determined cylinder charge, in particular the calculated MAF value, is then fed into the torque model of the internal combustion engine. This has the advantage that the original structure of the method or, as the case may be, the control of the internal combustion engine has to be broken open at one point only, while otherwise it can be retained.

Like the charge correction model, the detailed intake manifold model is mapped only onto the switchover-relevant pressure range. On account of a similarly large stored data quantity this results in the possibility of a higher precision compared to the basic intake manifold model, which is mapped onto a considerably greater pressure range.

Since the torque model according to FIG. 2 is not based on the air quantity values of the basic intake manifold model, the compute-intensive correction value calculations according to FIG. 1 are not required. The calculated air quantity of the detailed intake manifold model is incorporated directly into the torque model, with the result that subsequently the injection time TI, the ignition angle IGA and the throttle valve position TPS can be output.

It is also of advantage if the changeover from the basic intake manifold model to the detailed intake manifold model is designed to exhibit hysteresis. In this way a constant switching over during minor operating point variations, also known as jitter, is prevented.

The main advantage of the method described in the various embodiments above is therefore that in the switchover-relevant pressure range the air mass flowing into the cylinder is calculated much more precisely. This increases the accuracy of the torque prediction and the switchover operation of the valves is improved and executes without jolts. The fact that the characteristic maps are implemented narrowly in respect of the pressure range saves memory storage space and conserves the resources of the engine management system or operating control device. Furthermore the calculation of the correction values is performed only in the switchover-relevant pressure range and the further calculation is only carried out if a switchover request is present. As a result the additional computing overhead is small. The application overhead is likewise kept within limits. A further advantage of the method is that it can easily be integrated into existing engine management systems, irrespective of the functional structure used in each case.

The invention claimed is:

1. A method for controlling an internal combustion engine using a valve lift switchover, comprising:
   determining a cylinder charge via a basic intake manifold model for at least one first and one second valve lift of the internal combustion engine starting from a recorded intake manifold pressure;
   detecting a switchover-relevant pressure range for the valve lift switchover on the basis of the recorded intake manifold pressure; and
   determining a switchover cylinder charge corresponding to an operating point of the internal combustion engine for the switchover-relevant pressure range via a switchover intake manifold model, such that the valve lift switchover activated on the basis of the switchover cylinder charge is executed with constant torque of the internal combustion engine.

2. The method as claimed in claim 1, wherein the cylinder charge is a basic air quantity.

3. The method as claimed in claim 2, wherein the basic intake manifold model determines the basic cylinder charge for each valve lift based in each case on a separate basic characteristic map.

4. The method as claimed in claim 2, wherein the switchover intake manifold model is composed of the basic intake manifold model for each valve lift and a charge correction model for each valve lift.

5. The method as claimed in claim 4, wherein the basic intake manifold model determines the basic cylinder charge for each valve lift based in each case on a separate basic characteristic map.

6. The method as claimed in claim 5, wherein the charge correction model determines a correction value for the basic cylinder charge for each valve lift, the correction value added to the basic cylinder charge yields a correction cylinder charge.

7. The method as claimed in claim 6, wherein the correction value is a correction air quantity.

8. The method as claimed in claim 7, wherein the correction model has in each case a charge correction characteristic map per valve lift.

9. The method as claimed in claim 8, further comprises covering the switchover-relevant pressure range with the charge correction characteristic map.

10. The method as claimed in claim 9, further comprises correcting operating data of the engine for the purpose of torque correction of the latter, taking into account the correction cylinder charge and specific correction variables determined on this basis, an ignition angle correction and a correction of a throttle valve position.

11. The method as claimed in claim 10, wherein the specific correction variables include an injection time correction.

12. The method as claimed in claim 9, further comprises determining the correction cylinder charge in a weighted manner, wherein the correction value is incorporated into the correction cylinder charge in decreasing proportion as the distance from a switchover pressure increases.

13. The method as claimed in claim 2, wherein the switchover intake manifold model is formed solely by a detailed intake manifold model for each valve lift limited to the switchover-relevant pressure range.

14. The method as claimed in claim 13, wherein the detailed intake manifold model calculates the switchover cylinder charge for the respective valve lift specifically or determines the charge based on a charge characteristic map specific to each valve lift.

15. The method as claimed in claim 13, wherein the detailed intake manifold model is implemented with greater precision than the basic intake manifold model in respect of the determination of the cylinder charge in order to save computing power or memory storage capacity.

16. The method as claimed in claim 13, wherein the detailed intake manifold model is implemented with greater precision than the basic intake manifold model in respect of the determination of the cylinder charge in order to save computing power and memory storage capacity.

* * * * *